(12) United States Patent
Jackson et al.

(10) Patent No.: US 10,059,192 B2
(45) Date of Patent: Aug. 28, 2018

(54) SYSTEM AND METHOD FOR ADJUSTING AIR FLOW IN AN ENGINE COMPARTMENT OF AN OFF-ROAD VEHICLE

(71) Applicant: CNH Industrial America LLC, New Holland, PA (US)

(72) Inventors: Dwayne St. George Jackson, Plainfield, IL (US); Jonathan Eziquiel-Shriro, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/742,051

(22) Filed: Jun. 17, 2015

(65) Prior Publication Data

US 2016/0368365 A1 Dec. 22, 2016

(51) Int. Cl.
 B60K 11/08 (2006.01)
 F01P 7/10 (2006.01)
 (Continued)

(52) U.S. Cl.
 CPC ............ B60K 11/085 (2013.01); A01B 76/00 (2013.01); B60K 1/00 (2013.01); B62D 25/12 (2013.01);
 (Continued)

(58) Field of Classification Search
 CPC ....... B60K 11/08; B60K 11/085; B60K 11/04; B60K 11/06; B62D 25/10; B62D 25/105; B62D 25/12; F01P 11/10; F01P 7/10
 See application file for complete search history.

(56) References Cited

U.S. PATENT DOCUMENTS

| 959,571 | A | * | 5/1910 | Mays | ................. | B60K 11/08 |
| | | | | | | 165/41 |
| 1,573,659 | A | * | 2/1926 | Thompson | ............. | B60K 11/08 |
| | | | | | | 180/68.1 |

(Continued)

FOREIGN PATENT DOCUMENTS

| DE | 102009038428 A1 | 2/2011 |
| JP | 2002079956 A | 3/2002 |
| WO | 03018343 A1 | 3/2003 |

OTHER PUBLICATIONS

U.S. Appl. No. 29/530,527, filed Jun. 17, 2015, Dwayne St. George Jackson.

(Continued)

*Primary Examiner* — Emma K Frick
(74) *Attorney, Agent, or Firm* — Rickard K. DeMille; Rebecca L. Henkel

(57) ABSTRACT

An air flow control system for an off-road vehicle includes a first movable side panel configured to be positioned proximate to a first lateral side surface of a body of an engine hood of the off-road vehicle. The system also includes a controller configured to receive a first signal indicative of a temperature of an engine of the off-road vehicle, to access a desired engine temperature range from a storage device, and to output a third signal to one or more actuators indicative of instructions to move the first movable side panel laterally outward relative to the first lateral side surface of the body to enable a flow of air through a gap between the first movable side panel and the body when the first signal indicates that the temperature of the engine of the off-road vehicle is greater than the desired engine temperature range.

12 Claims, 14 Drawing Sheets

(51) Int. Cl.
*A01B 76/00* (2006.01)
*B60K 1/00* (2006.01)
*B62D 25/12* (2006.01)

(52) U.S. Cl.
CPC .......... *F01P 7/10* (2013.01); *B60K 2001/006* (2013.01); *B60Y 2200/22* (2013.01); *B60Y 2200/221* (2013.01); *B60Y 2200/41* (2013.01); *Y02T 10/88* (2013.01)

(56) References Cited

U.S. PATENT DOCUMENTS

| | | | | |
|---|---|---|---|---|
| 1,698,186 | A * | 1/1929 | Carnie | B60K 11/085 180/68.4 |
| RE19,268 | E * | 8/1934 | Ball | B60H 1/28 454/149 |
| 4,081,050 | A | 3/1978 | Hennessey et al. | |
| 4,371,047 | A | 2/1983 | Hale et al. | |
| 4,454,926 | A | 6/1984 | Akins | |
| 4,850,444 | A * | 7/1989 | Bojanowski | B60K 11/08 180/68.1 |
| 4,889,382 | A * | 12/1989 | Burst | F01P 11/10 180/68.1 |
| 5,054,377 | A * | 10/1991 | Mochel | E04D 13/0358 296/217 |
| 5,120,105 | A * | 6/1992 | Brin | B62D 35/007 296/180.5 |
| 5,193,636 | A * | 3/1993 | Holm | B60K 11/08 180/68.1 |
| 5,275,249 | A * | 1/1994 | Nelson | B62D 25/12 180/68.1 |
| 5,522,637 | A * | 6/1996 | Spears | B62D 35/001 296/180.3 |
| 6,347,484 | B1 * | 2/2002 | Swanger | B60J 7/1642 49/193 |
| 6,655,486 | B2 | 12/2003 | Oshikawa et al. | |
| 6,848,524 | B2 | 2/2005 | Vaillancourt et al. | |
| 7,051,786 | B2 | 5/2006 | Vuk | |
| 7,128,178 | B1 * | 10/2006 | Heinle | B60K 11/04 165/41 |
| 7,226,119 | B1 * | 6/2007 | Weaver | B60H 1/26 296/180.1 |
| 7,559,391 | B2 * | 7/2009 | Bradley | B60K 11/085 180/68.1 |
| 8,311,708 | B2 * | 11/2012 | Kerns | F01P 7/10 701/101 |
| 8,347,994 | B2 | 1/2013 | Bering et al. | |
| 8,419,120 | B2 * | 4/2013 | Babbage | B60J 7/1642 296/216.02 |
| 8,505,660 | B2 | 8/2013 | Fenchak et al. | |
| 8,556,013 | B2 | 10/2013 | Sturmon et al. | |
| 8,777,299 | B2 * | 7/2014 | Langford, Jr. | B62D 25/10 180/69.2 |
| 8,807,630 | B2 | 8/2014 | Rode et al. | |
| 8,893,834 | B2 | 11/2014 | Berkeland | |
| 8,960,342 | B2 * | 2/2015 | Werner | B60K 11/04 165/41 |
| 9,109,594 | B2 * | 8/2015 | Pawlick | F04B 53/08 |
| 9,855,981 | B1 * | 1/2018 | Dunford | B62D 35/00 |
| 2007/0007061 | A1 * | 1/2007 | Meyer | B60K 11/04 180/68.1 |
| 2010/0051712 | A1 | 3/2010 | Lebeck | |
| 2010/0326755 | A1 | 12/2010 | Husson et al. | |
| 2011/0061405 | A1 * | 3/2011 | Watanabe | B60H 1/3227 62/61 |
| 2013/0103265 | A1 * | 4/2013 | Remy | B60K 11/085 701/49 |
| 2013/0146377 | A1 | 6/2013 | Adamson et al. | |
| 2014/0039765 | A1 * | 2/2014 | Charnesky | F01P 7/10 701/49 |
| 2014/0151139 | A1 | 6/2014 | Rizzon | |
| 2015/0226107 | A1 * | 8/2015 | Bang | B60K 11/04 123/41.05 |
| 2015/0343894 | A1 * | 12/2015 | Yoshioka | B60K 11/06 180/68.1 |

OTHER PUBLICATIONS

U.S. Appl. No. 29/530,531, filed Jun. 17, 2015, Dwayne St. George Jackson.
U.S. Appl. No. 29/530,538, filed Jun. 17, 2015, Dwayne St. George Jackson.
Extended European Search Report for EP Application No. 16174886.8 dated Nov. 21, 2016, 10 pgs.

* cited by examiner

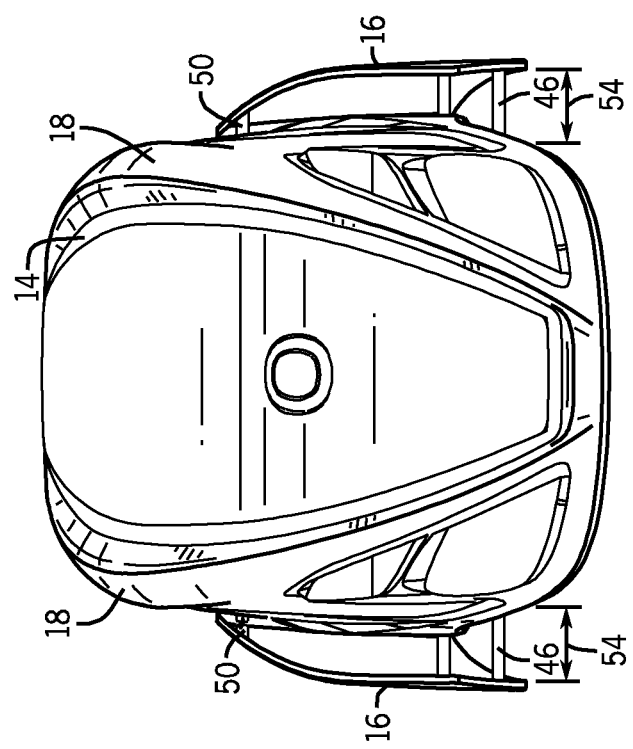
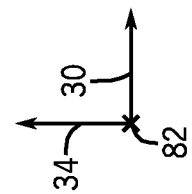
FIG. 4

SYSTEM AND METHOD FOR ADJUSTING AIR FLOW IN AN ENGINE COMPARTMENT OF AN OFF-ROAD VEHICLE

BACKGROUND

The present application relates generally to off-road vehicles, and more specifically, to systems and methods for adjusting air flow in an engine compartment of the off-road vehicle.

Engines of off-road vehicles, such as trucks, tractors, combines, and other specialized vehicles for use in various construction or agricultural applications, generally operate most efficiently within a range of engine temperatures. Engines of off-road vehicles may be cool during start-up and generate heat during operation. Unfortunately, the heat may be trapped within an engine compartment of the off-road vehicle, and may overheat components of the engine and/or lead to operational inefficiency.

BRIEF DESCRIPTION

In one embodiment, an air flow control system for an off-road vehicle includes a first movable side panel configured to be positioned proximate to a first lateral side surface of a body of an engine hood of the off-road vehicle. The system also includes a controller configured to receive a first signal indicative of a temperature of an engine of the off-road vehicle, access a desired engine temperature range from a storage device, and to output a third signal to one or more actuators indicative of instructions to move the first movable side panel laterally outward relative to the first lateral side surface of the body of the engine hood to enable a flow of air through a gap between the first movable side panel and the body of the engine hood when the first signal indicates that the temperature of the engine of the off-road vehicle is greater than the desired engine temperature range.

In one embodiment, a method of operating an air flow control system for an off-road vehicle includes receiving a first signal indicative of a temperature of an engine of the off-road vehicle at a processor, and receiving, at the processor, a second signal indicative of a desired temperature range of the engine from a memory device of the air flow control system. The method also includes determining, using the processor, a target lateral position of one or more movable side panels based at least in part on the temperature and the desired temperature range. The method further includes outputting, using the processor, a third signal to one or more actuators indicative of instructions to adjust the one or more movable side panels laterally relative to a body of an engine hood of the off-road vehicle to the target lateral position.

In one embodiment, an air flow control system for an off-road vehicle includes a first movable side panel configured to be positioned on a first lateral side of a body of an engine hood of the off-road vehicle. The system also includes one or more bars extending laterally inward from the first movable side panel, wherein the one or more bars are configured to couple the first movable side panel to the body of the engine hood. The system also includes one or more actuators coupled to the one or more bars and configured to move the first movable side panel laterally outward relative to the first lateral side body of the engine hood in response to one or more signals from a controller of the air flow control system.

DRAWINGS

These and other features, aspects, and advantages of the present invention will become better understood when the following detailed description is read with reference to the accompanying drawings in which like characters represent like parts throughout the drawings, wherein:

FIG. 4 is a front view of an embodiment of the engine hood of FIG. 1, with the movable side panels in an open position;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to systems and methods for adjusting air flow in an engine compartment of an off-road vehicle (e.g., an agricultural vehicle). In certain embodiments, the system may be configured to adjust the air flow in the engine compartment to cool the engine and/or to maintain the engine temperature within a desired engine temperature range. During operation, an engine of the off-road vehicle generates heat, thereby causing an increase in the engine temperature. The disclosed system includes one or more movable panels configured to move between a closed position in which the engine compartment is covered and an open position in which air is exhausted out of the engine compartment, thereby cooling the engine (e.g., to a desired temperature). In the closed position, the engine may be advantageously protected from freezing ambient air, debris, tampering, or the like.

Figure 1:
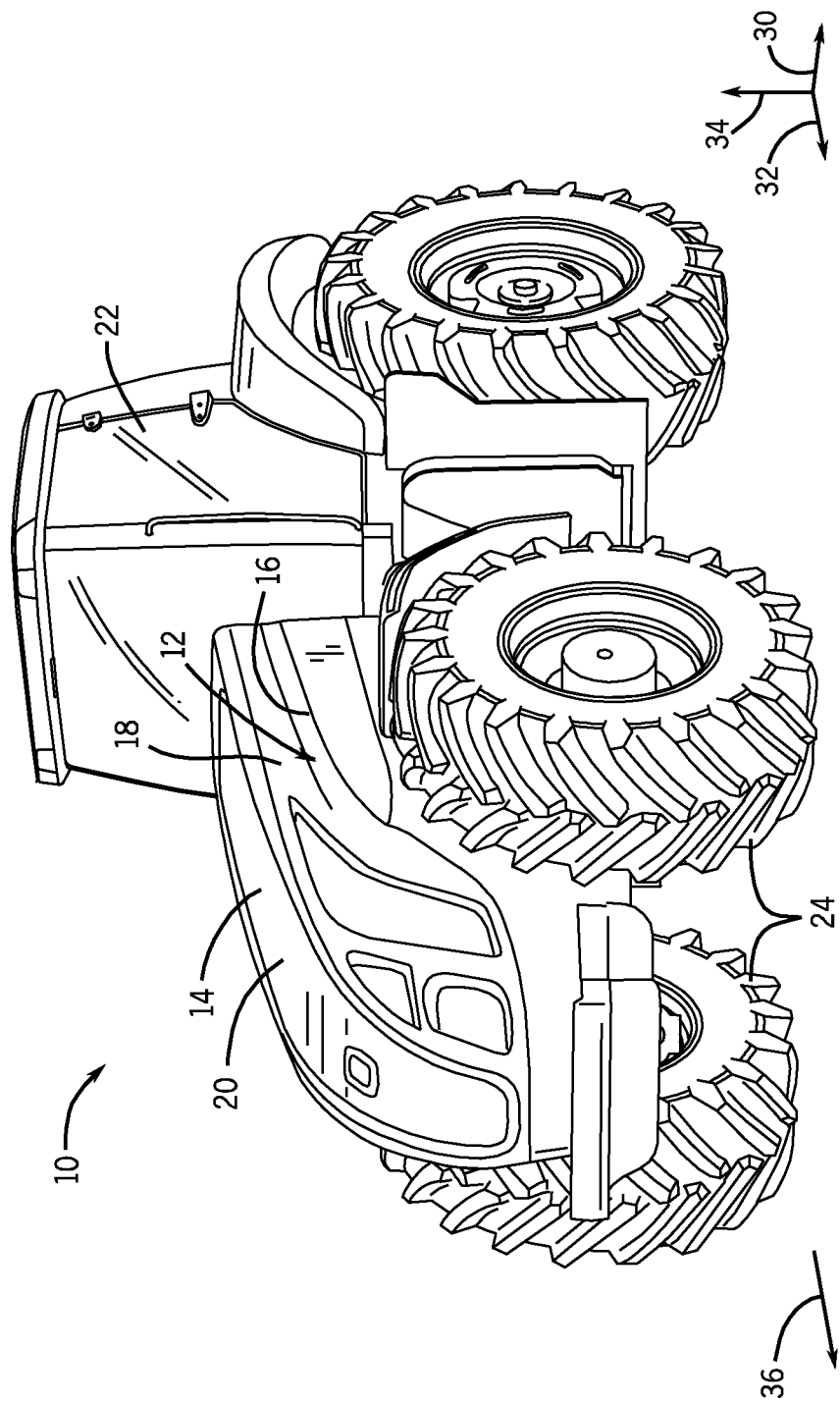
FIG. 1 is a perspective view of an embodiment of an off-road vehicle having an engine hood with movable side panels.

With the foregoing in mind, FIG. 1 is a perspective view of an exemplary off-road vehicle 10 that includes an air flow system 12 for adjusting air flow under an engine hood 14 of the off-road vehicle 10. As discussed in more detail below, the system 12 may include one or more movable side panels 16 configured to move between a closed position and an open position. The one or more movable side panels 16 may have any suitable configuration to adjust air flow under the engine hood 14. As shown, one movable side panel 16 is disposed on a lateral side surface 18 of the engine hood 14. While one movable side panel 16 is shown and described in detail below to facilitate discussion, it should be understood that two movable side panels 16 may be disposed on an opposite lateral side surfaces 18 of the engine hood 14. In some embodiments, the system 12 may be configured to adjust a position of the movable side panel 16 (e.g., move the movable side panel 16 between a closed position to an open position, and vice versa) in response to operator input. In certain embodiments, the system 12 may be configured to automatically adjust the position of the movable side panel 16 based at least in part on a temperature of the engine as detected by a temperature sensor positioned proximate to the engine. Additionally or alternatively, as discussed below, one or more slideable panels or hinged panels may be disposed on an upper surface 20 of the engine hood 14 to adjust air flow under the engine hood 14.

As shown, the off-road vehicle 10 has a cabin 22 where an operator may sit or stand to operate the off-road vehicle 10. In the illustrated embodiment, the vehicle 10 has wheels 24 that rotate to move the off-road vehicle 10. The off-road vehicle 10 may be further defined as having a lateral axis 30, a longitudinal axis 32, and a vertical axis 34. Additionally, the vehicle 10 may travel in a forward direction 36 (e.g., direction of travel). In the illustrated embodiment, the vehicle 10 is an agricultural tractor. However, any suitable agricultural or off-road vehicle, including self-propelled vehicles, sprayers, combines, trucks, and so forth may utilize aspects of the disclosed embodiments. It should be understood that in some vehicles, the wheels 24 may be replaced with tracks or other drive systems.

Figure 2:
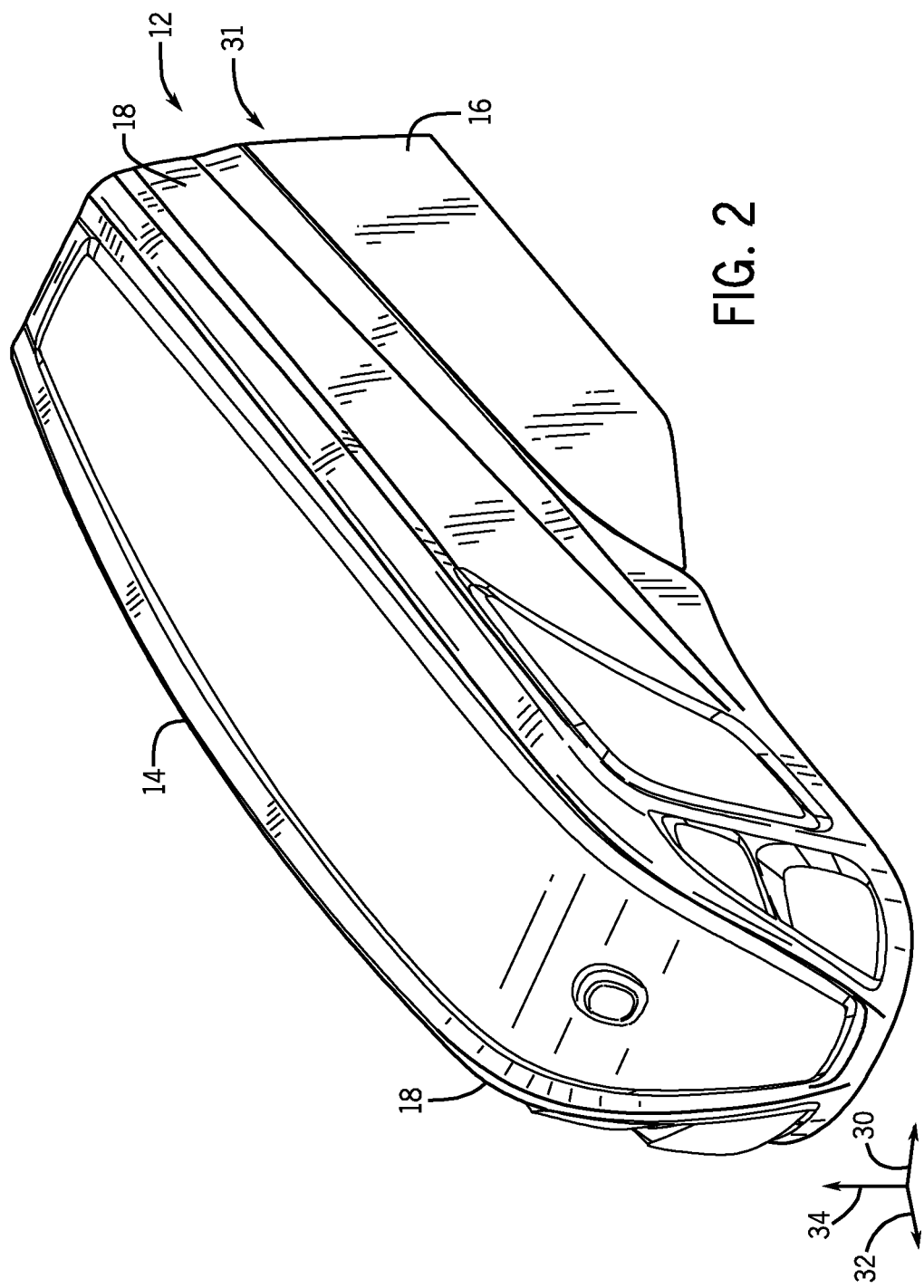
FIG. 2 is a perspective view of an embodiment of the engine hood of FIG. 1 with the movable side panels in a closed position.

FIG. 2 is a perspective view of an embodiment of the engine hood 14 illustrating one movable side panel 16 in a closed position 31. As noted above, it should be understood that at least two movable side panels 16 may be disposed on opposite lateral side surfaces 18 of the engine hood 14. In the closed position 31, the movable side panel 16 is laterally aligned with the lateral side surface 18 of the engine hood 14 and generally covers the engine and other components under the engine hood 14, thereby protecting the engine from freezing ambient air, debris, or the like.

Figure 3:
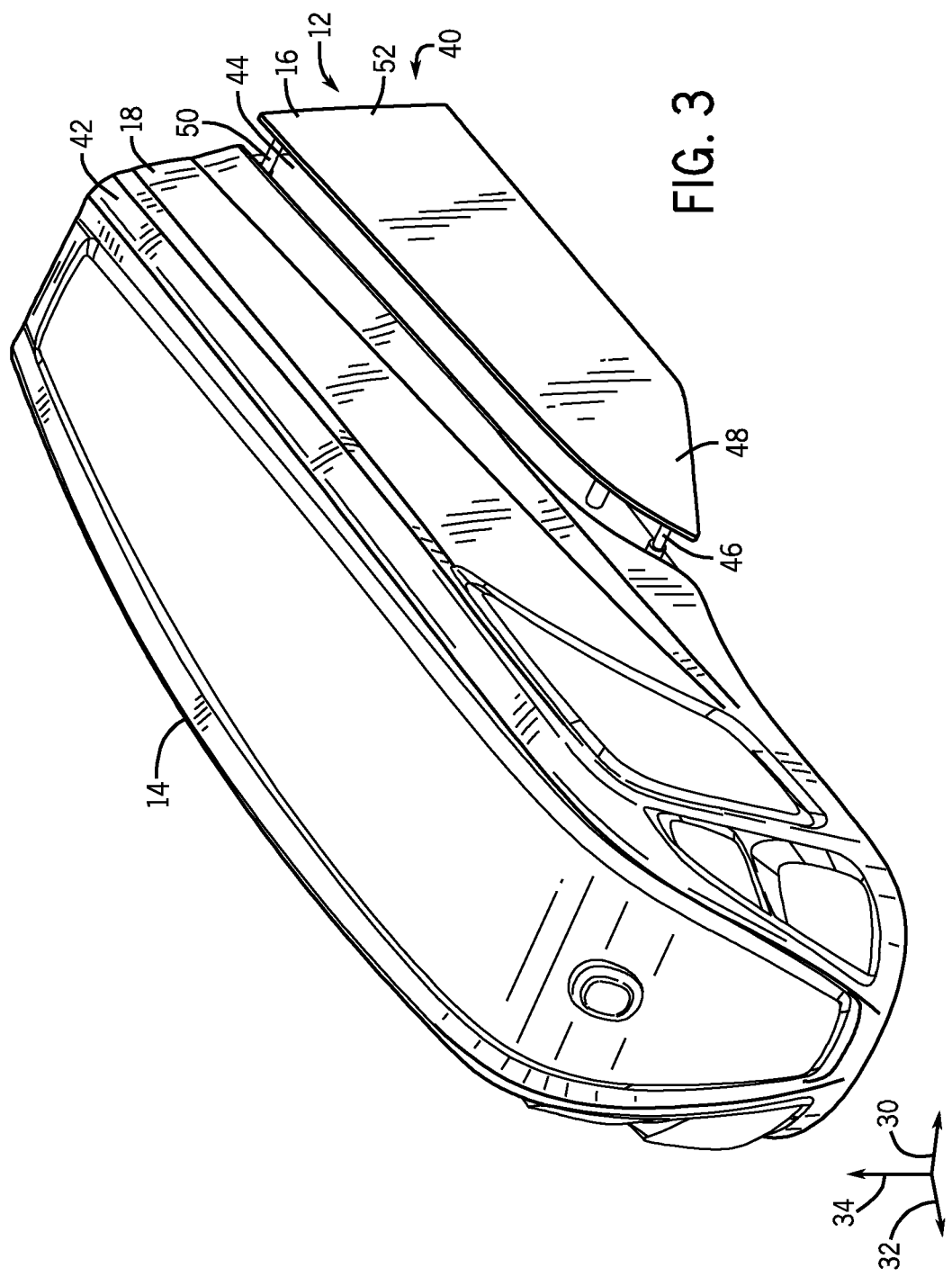
FIG. 3 is a perspective view of an embodiment of the engine hood of FIG. 1, with the movable side panels in an open position.

FIG. 3 is a perspective view of an embodiment of the engine hood 14 with one movable side panel 16 in an open position 40. In the open position 40, at least a portion of the movable side panel 16 is positioned laterally outward from the lateral side surface 18 of a body 42 of the engine hood 14 such that a gap 44 is provided between the movable side panel 16 and the body 42. In the open position 40, air from under the engine hood 14 may exhaust through the gap 44 and/or ambient air may pass through the gap 44, thereby facilitating engine cooling.

The movable side panel 16 may be coupled to the body 42 of the engine hood 14 via any suitable structure. In the illustrated embodiment, the movable side panel 16 is coupled to the body 42 via multiple bars, which are supported by the body 42 of the engine hood 14. The movable side panel 16 may be welded to each of the multiple bars or attached to each of the multiple bars via a suitable coupling device (e.g., a threaded fastener). In particular, at least one forward bar 46 couples a forward portion 48 of the movable side panel 16 to the body 42, and at least one rearward bar 50 couples a rearward portion 52 of the movable side panel 16 to the body 42. As discussed in more detail below, the bars 46, 50 may be coupled to or be part of one or more actuators (e.g., solenoid-controlled actuator, hydraulic cylinder, pneumatic cylinder, electric motor) configured to drive at least an adjustable portion of the bars 46, 50 laterally outward from the body 42 to move the movable side panel 16 from the closed position 31 to the open position 40, or to any position therebetween. The one or more actuators are also configured to drive the bars 46, 50 laterally inward from the body 42 to move the movable side panel 16 from the open position 40 to the closed position 31, or to any position therebetween.

In some embodiments, the at least one forward bar 46 may be coupled to one actuator and the at least one rearward bar 50 may be coupled to a different actuator to enable independent adjustment of the forward and rearward portions 48, 52 of the movable side panel 16. In some embodiments, each of the bars 46, 50 may be coupled to a respective actuator. Furthermore, in some embodiments, the two or more movable side panels 16 may be adjusted by the same or different actuators. As discussed in more detail below, a controller may receive engine temperature data from one or more sensors (e.g., an engine temperature sensor), and the controller may cause the actuator(s) to drive the bars 46, 50, and the movable side panel 16 laterally to reach and/or to maintain a desired engine temperature. In some embodiments, the controller may receive an operator input (e.g., via inputs) and may cause the actuator(s) to drive the bars 46, 50, and the movable side panel 16, laterally based at least in part on the operator input.

FIG. 4 is a front view of the engine hood 14 with two movable side panels 16 in the open position 40. As shown, the movable side panels 16 are positioned on opposite lateral sides 18 of the engine hood 14 (e.g., one movable side panel 16 is disposed on a first lateral side and another movable side panel 16 is disposed on a second lateral side). Each of the movable side panels 16 may be coupled to one or more corresponding forward bars 46 and one or more corresponding rearward bars 50, which are adjusted via one or more actuators. The controller (e.g., based at least in part on signals received from a temperature sensor, a position sensor, and/or an operator input to the controller) may cause the one or more actuators to drive the bars 46, 50 to move the movable side panels 16 simultaneously or separately (e.g., independently or at different times). Furthermore, the controller may cause the one or more actuators to move each of the movable side panels 16 a substantially similar distance 54 laterally outward from a respective lateral side 18 of the body 42, or to move each of the movable side panels 16 a different distance laterally outward from a respective lateral side 18 of the body 42. Furthermore, in some embodiments, the controller may cause the actuator to adjust only one or a subset of the movable side panels 16. For example, the controller may cause the actuator to adjust one of the movable side panels 16 to the closed position 31 to block one portion of the engine from debris, and to maintain the other one of the movable side panels 16 in the open position 40 to facilitate air flow proximate to another portion of the engine.

Figure 5:
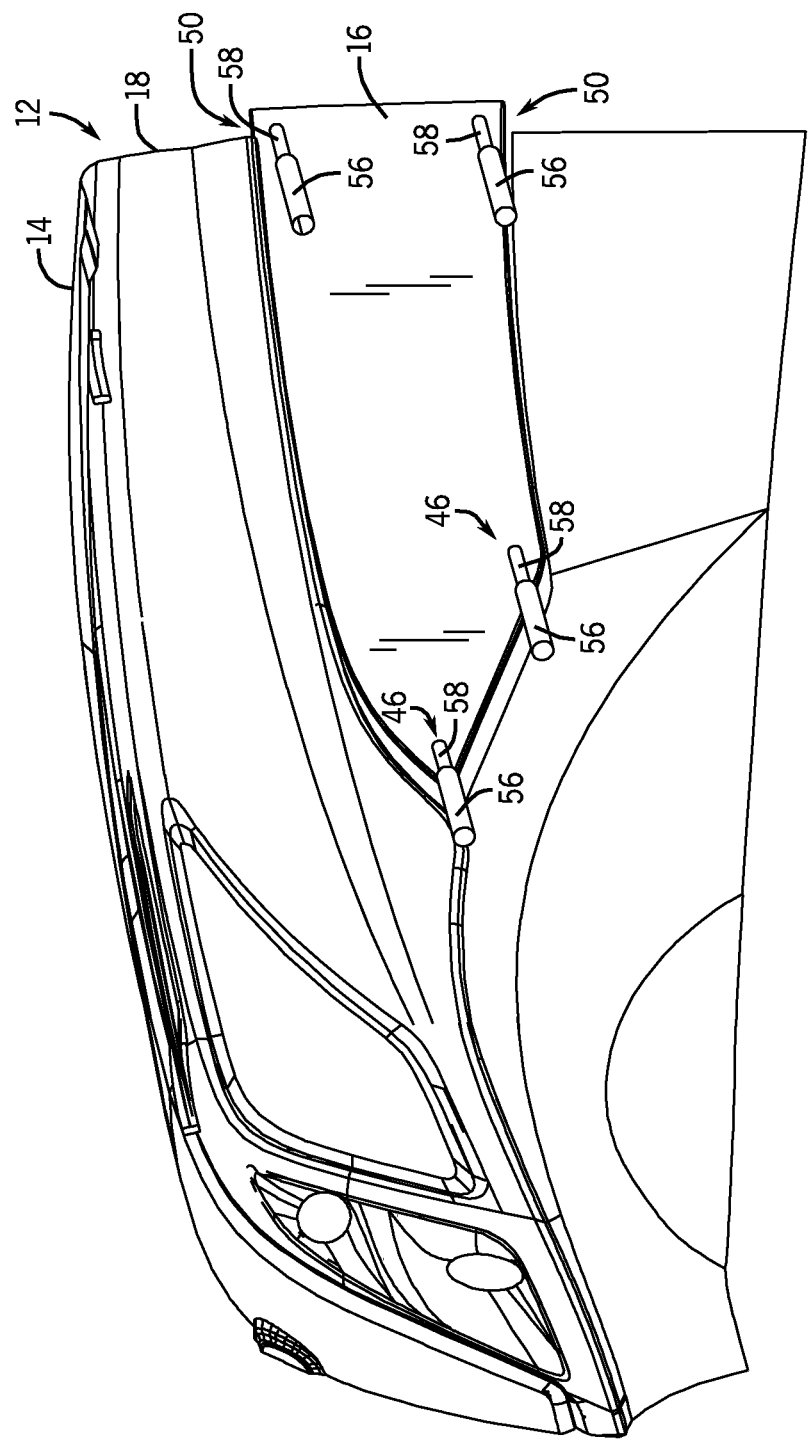
FIG. 5 is a perspective cross-sectional view of an embodiment of one movable side panel of FIG. 2.

FIG. 5 is a perspective cross-sectional view of one movable side panel 16 in the open position 40. In the illustrated embodiment, the movable side panel 16 is coupled to two forward bars 46 and two rearward bars 50. Although two forward bars 46 and two rearward bars 50 are shown, it should be understood that any suitable number of bars may be provided. In the illustrated embodiment, each of the bars 46, 50 is a telescoping bar having a stationary portion 56 supported by the body 42 of the engine hood 14 and an adjustable portion 58 that moves laterally within the stationary portion 56. The adjustable portion 58 of each bar 46, 50 is driven laterally outward by an actuator. In some embodiments, one portion of the actuator may be coupled to the body 42 of the engine hood 14 or to any suitable support structure within the hood 14 that is stationary with respect to the hood 14, and another portion of the actuator may be coupled to the adjustable portion 58 of each bar 46, 50. In some embodiments, a position sensor may be provided adjacent to one or more of the bars 46, 50 and/or the actuator (e.g., the actuator may be a position-sensing actuator, such as a position-sensing hydraulic cylinder) to detect a current position of the bar 46, 50 and/or the actuator. A signal provided by the position sensor to the controller may enable the controller to determine a current position of the movable side panel 16 and may enable the controller to appropriately adjust the movable side panel 16 (e.g., to maintain the desired engine temperature).

Figure 6:
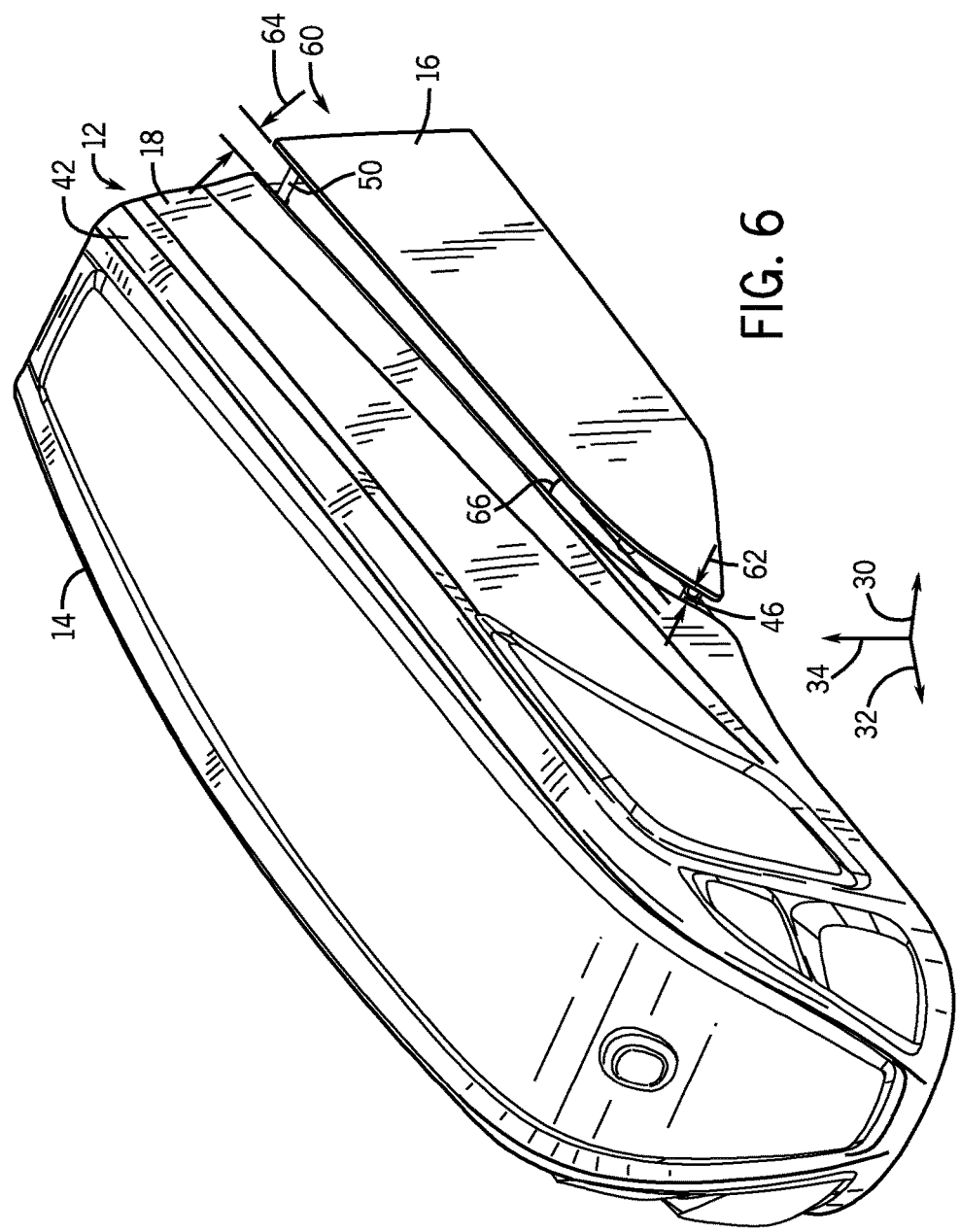
FIG. 6 is a perspective view of an embodiment of the engine hood of FIG. 1, with the movable side panels in a rear-facing open position.

FIG. 6 is a perspective view of the engine hood 14 with the movable side panels 16 in a rear-facing open position 60. The rear-facing open position 60 may enable air to exhaust through the gap 44, thereby cooling the engine, while also providing protection from debris (e.g., some debris may be deflected laterally outward away from the engine compartment, the cab 22 of the off-road vehicle 10, and/or an implement coupled to the off-road vehicle 10 by the movable side panel 16). In the rear-facing open position 60, the at least one forward bar 46 extends a first distance 62 laterally outward from the lateral side surface 18 of the body 42, and the at least one rearward bar 50 extends a second distance 64, greater than the first distance 62, laterally outward from the lateral side surface 18 of the body 42. In certain embodiments, the second distance 64 may be approximately 5, 10, 15, 20, 25, 30, 40, 50, 60, 70, 80, 90 percent greater than the first distance 62 while the movable side panel 16 is in the rear-facing open position 60. In certain embodiments, the movable side panel 16 may be oriented at a first angle 66 relative to the lateral side surface 18 of the body 42 when the movable side panel 16 is in the rear-facing open position 60. In some embodiments, the first angle 66 may be between approximately 5-45, 10-40, 15-35, or 20-30 degrees. In some embodiments, the first angle 66 may be greater than approximately 5, 10, 15, 20, 25, 30, 35, 40, or 45 degrees. Although both the at least one forward bar 46 and the at least one rearward bar 50 extend laterally outward from the lateral side surface 18 in the embodiment of FIG. 5, it should be understood that in some embodiments the forward bar 46 may not extend laterally outward when the movable side panel 16 is in the rear-facing open position 60. In some embodiments, the movable side panel 16 may be configured to pivot about one end of the at least forward bar 46 or about a pivot disposed proximate to the forward portion 48 of the movable side panel 16 to enable the movable side panel 16 to move into the rear-facing open position 60.

Figure 7:
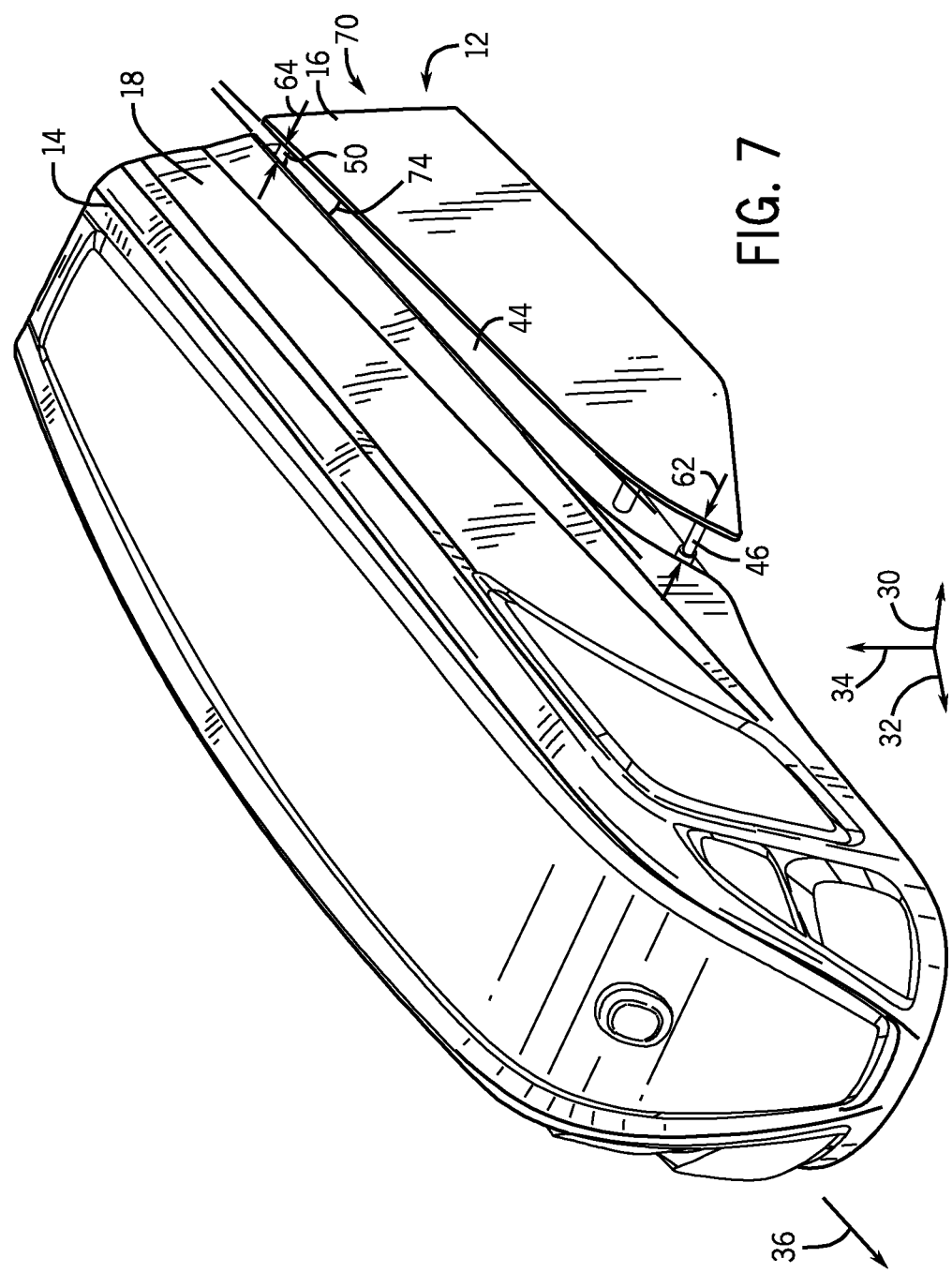
FIG. 7 is a perspective view of an embodiment of the engine hood of FIG. 1, with the movable side panels in a forward-facing open position.

FIG. 7 is a perspective view of an embodiment of the engine hood 14 with the movable side panel 16 in a forward-facing open position 70. The forward-facing open position 70 may enable air to exhaust via the gap 44 and/or may facilitate a flow of ambient air into the engine compartment as the off-road vehicle 10 travels in the direction of travel 36, thereby cooling the engine. In the forward-facing open position 70, the at least one forward bar 46 extends the first distance 62 laterally outward from the lateral side surface 18 of the body 42, and the at least one rearward bar 50 extends the second distance 64, less than the first distance 62, laterally outward from the lateral side surface 18 of the body 42. In certain embodiments, the first distance 62 may be approximately 5, 10, 15, 20, 25, 30, 40, 50, 60, 70, 80, 90 percent greater than the second distance 64 when the movable side panel 16 is in the forward-facing open position 70. In certain embodiments, the movable side panel 16 may be oriented at a second angle 74 relative to the lateral side surface 18 of the body 42 when the movable side panel 16 is in the forward-facing open position 70. In some embodiments, the second angle 74 may be between approximately 5-45, 10-40, 15-35, or 20-30 degrees. In some embodiments, the second angle 74 may be greater than approximately 5, 10, 15, 20, 25, 30, 35, 40, or 45 degrees. Although both the at least one forward bar 46 and the at least one rearward bar 50 extend laterally outward from the lateral side surface 18 in the embodiment of FIG. 6, it should be understood that in some embodiments the rearward bar 50 may not extend laterally outward while the movable side panel 16 is in the forward-facing open position 70. In some embodiments, the movable side panel 16 may be configured to pivot about one end of the rearward bar 50 or about a pivot disposed proximate to the rearward portion 52 of the movable side panel 16 to enable the movable side panel 16 to move into the forward-facing open position 70. Each of the movable side panels 16 may be configured to move between the closed position 31, the open position 40, the rearward-facing open position 60, and/or the forward-facing open position 70.

Figure 8:
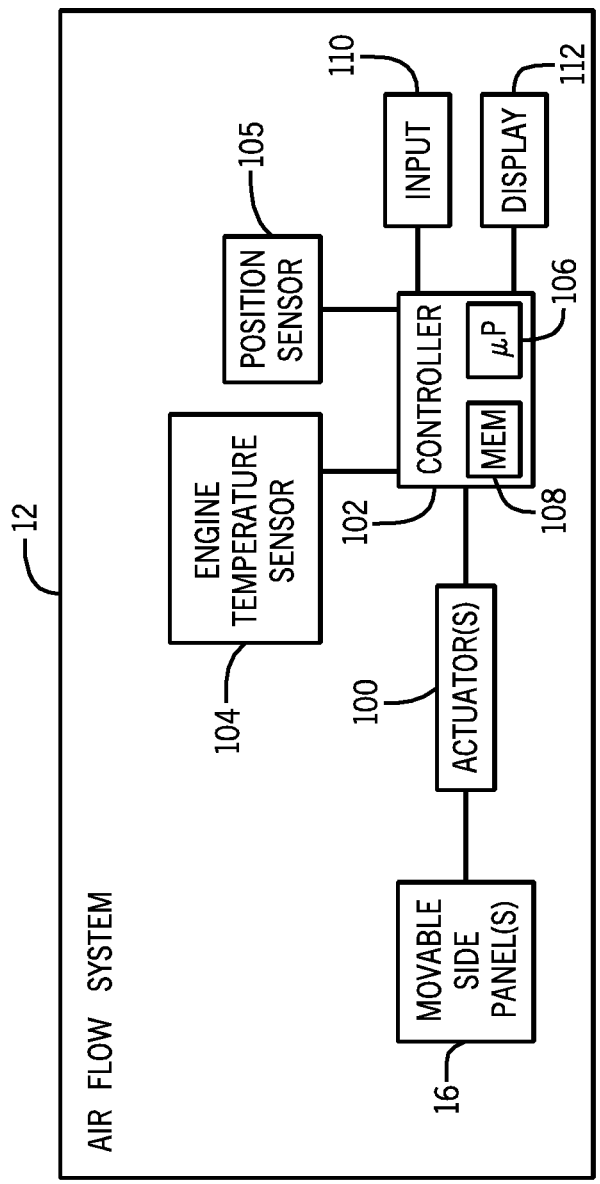
FIG. 8 is a schematic diagram of an embodiment of an air flow system for adjusting the movable side panels of the engine hood of FIG. 1.

FIG. 8 is a schematic diagram of an embodiment of the air flow system 12. As shown, the system 12 includes the one or more movable side panels 16 and one or more actuators 100 (e.g., solenoid-controlled actuators, hydraulic cylinders, pneumatic cylinder, electric motor, or the like) configured to adjust the movable side panels 16 relative to the body 42 of the engine hood 14. As discussed above, any suitable number of actuators 100 may be provided within the system 12.

Additionally, in the illustrated embodiment, a controller 102 is provided to control the one or more actuators 100 to adjust the position of the movable side panels 16. In certain embodiments, the controller 102 is an electronic controller having electrical circuitry configured to receive and to process signals from one or more sensors. For example, the controller 102 may be configured to receive and to process signals indicative of an engine temperature from one or more engine temperature sensors 104. As noted above, the controller 102 may be configured to receive and to process signals indicative of a position of the movable side panels 16 from one or more position sensors 105. Furthermore, the controller 102 may be configured to receive and to process an operator input received via an operator input 110. In the illustrated embodiment, the controller 102 includes a processor, such as the illustrated microprocessor 106, and a memory device 108. The controller 102 may also include one or more storage devices and/or other suitable components. The processor 106 may be used to execute software, such as software for controlling the air flow system 12, the one or more actuators 100, and so forth. Moreover, the processor 106 may include multiple microprocessors, one or more "general-purpose" microprocessors, one or more special-purpose microprocessors, and/or one or more application specific integrated circuits (ASICS), or some combination thereof. For example, the processor 106 may include one or more reduced instruction set (RISC) processors.

The memory device 108 may include a volatile memory, such as random access memory (RAM), and/or a nonvolatile memory, such as ROM. The memory device 78 may store a variety of information and may be used for various purposes. For example, the memory device 108 may store processor-executable instructions (e.g., firmware or software) for the processor 106 to execute, such as instructions for controlling the air flow system 12 and/or the one or more actuators 100. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., a desired engine temperature range, or the like), instructions (e.g., software or firmware for controlling the air flow system 12, or the like), and any other suitable data.

The controller 102 may control the one or more actuators 100 based on any of a variety of inputs or factors, including signals indicative of the engine temperature obtained by the engine temperature sensor 104, signals indicative of a position of the movable side panels 16 obtained by the position sensor 105, a temperature of the ambient air (e.g., obtained from an ambient air temperature sensor), an operator input received via the operator input 110, and/or a desired engine temperature range (e.g., a predetermined range, which may be obtained from the memory device 108). For example, the engine temperature sensor 104 may monitor the engine temperature and provide a first signal indicative of the engine temperature to the processor 106. Additionally, the processor 106 may access and/or receive a second signal indicative of a desired engine temperature range and/or a desired temperature threshold from any suitable source, such as the memory device 108. If the first signal indicates that the engine temperature is greater than the desired temperature range or desired temperature threshold, the controller 102 may control the one or more actuators 100 to move one or both of the movable side panels 16 into the open position 30, the rearward-facing open position 60, or the forward-facing open position 70 to facilitate engine cooling.

As noted above, in some embodiments, the processor 106 may be configured to receive various operator inputs via the operator input 110 and to control the one or more actuators 100 based at least in part on the operator inputs. In particular, the processor 106 may be configured to receive an operator input via the operator input 110 indicating that one or more of the movable side panels 16 should be moved to a particular position (e.g., the closed position 31, the open position 40, the rear-facing open position 60, or the forward-facing open position 70), and the processor 106 may be configured to provide a signal to the one or more actuators 100 to adjust one or both of the movable side panels 16 to particular position. For example, the operator may provide an input via the operator input 110 instructing the processor 106 to move one of the movable side panels to the closed position 31 to protect the engine from foliage or other debris on one side of the off-road vehicle 10, and, in response, the processor 106 may provide a signal to the one or more actuators 100 to move the movable side panel 16 to the closed position 31.

By way of another example, if the operator provides an input to close the movable side panel 16 and the engine temperature as indicated by the signal received from the temperature sensor 104 is at least a predetermined percentage greater (e.g., 10, 20, 30, 40, 50 or more) than the desired engine temperature range, the controller 102 may adjust the movable side panel 16 to the rear-facing open position 60 to protect the engine from debris while also enabling air to exhaust from the engine compartment. In some embodiments, the controller 102 may be configured to provide an indication (e.g., via a display 112) of the current position of the movable side panels 16, the current movement of the movable side panel, the engine temperature, and/or the desired engine temperature range.

In some embodiments, the controller 102 may be configured to control the one or more actuators 100 to move the one or more movable side panels 16 from the closed position 31 to the open position 40, the rear-facing open position 60, or the forward-facing open position 70 upon engine start-up, at a predetermined time after engine start-up (e.g., a predetermined time stored in and accessed from the memory 108), or at a time set by the operator via the operator input 110, for example. In some embodiments, the controller 102 may be configured to control the one or more actuators 100 to move the one or more movable side panels 16 from the open position 40 to the closed position 31 upon engine shut down or upon input received via the operator input 110, for example.

Figure 9:
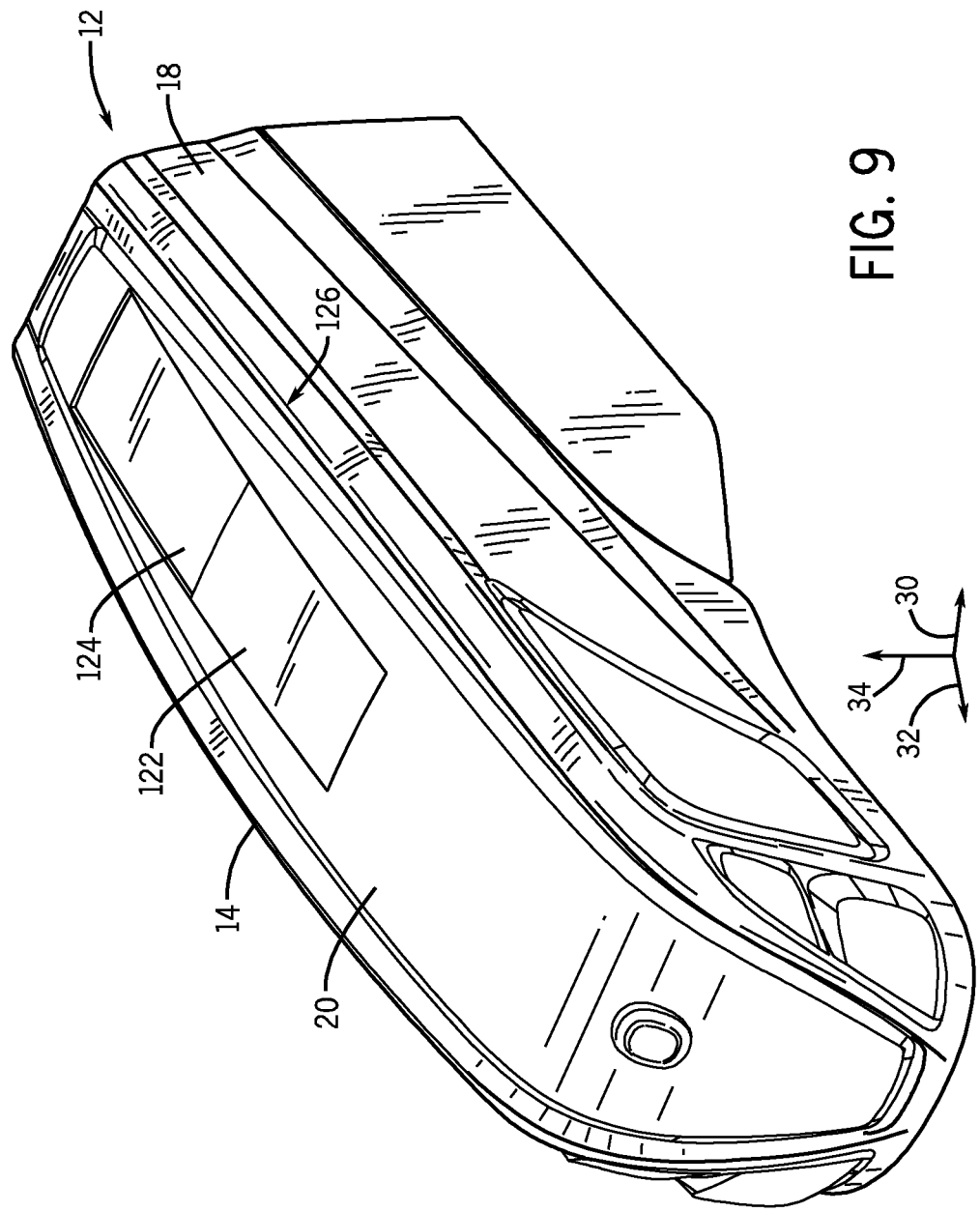
FIG. 9 is a perspective view of an embodiment of an engine hood with slidable top panels that may be used with the off-road vehicle of FIG. 1.

In certain embodiments, the air flow control system 12 may additionally or alternatively include one or more adjustable panels positioned on other regions of the engine hood 14. For example, the air flow control system 12 may include the movable side panels 16, slideable top panels, and/or hinged panels. FIG. 9 is a perspective view of an embodiment of the engine hood 14 having slidable top panels positioned on the upper surface 20 of the engine hood 14. In the illustrated embodiment, a first slideable top panel 122 (e.g., a forward slideable top panel) and a second slideable top panel 124 (e.g., a rearward slideable top panel) are in a closed position 126. In the closed position 126, the slideable top panels 122, 124 are configured to cover the engine, thereby protecting the engine from freezing ambient air, debris, or the like. Each of the first slideable top panel 122 and the second slideable top panel 124 are configured to move relative to the engine hood 14. The slideable top panels 122, 124 may be adjusted in a similar manner as the movable side panels 16 discussed above with respect to FIGS. 1-9. For example, the controller 102 may be configured to control one or more actuators coupled to the first slideable top panel 122 and the second slideable top panel 94 to adjust one or both of the slideable top panels 122, 124 relative to the engine hood 14 based on any of a variety of inputs or factors, including signals indicative of the engine temperature obtained by the engine temperature sensor 104, signals indicative of a position of the movable side panels 16 obtained by the position sensor 105, a temperature of the ambient air, an operator input received via the operator input 110, and/or a desired engine temperature range (e.g., a predetermined range).

Figure 10:
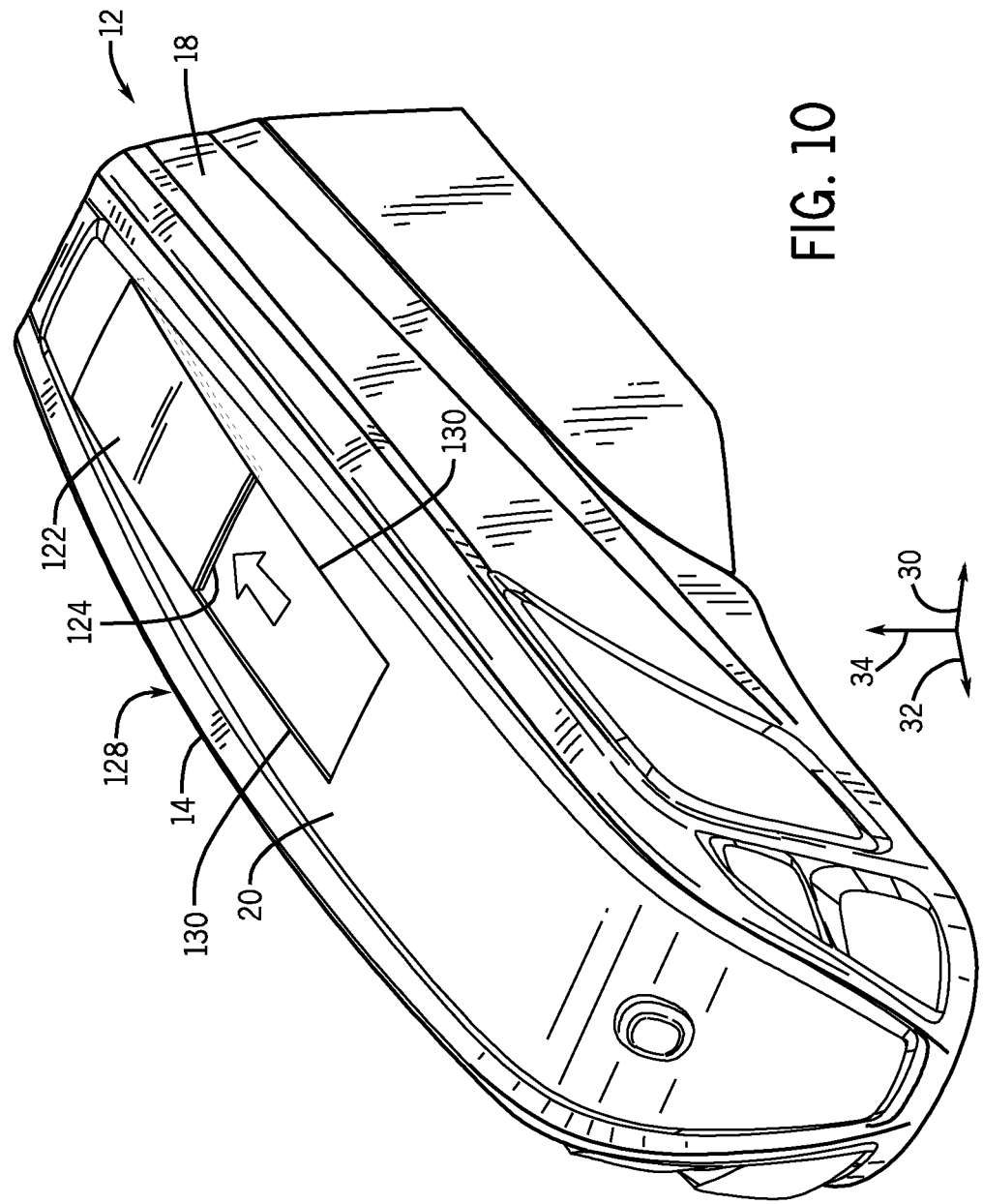
FIG. 10 is a perspective view of an embodiment of the engine hood of FIG. 7 with the slidable top panels in a first open position.

FIG. 10 is a perspective view of the engine hood 14 having the first slidable top panel 120 in an open position 122. In the open position 128, the first slideable top panel 120 may move forward beneath the upper surface 20 of the engine hood 14, or the first slideable top panel 122 may move rearward beneath or above the second slideable top panel 124 to expose (e.g., uncover) at least a portion of the engine compartment. In the open position 128, the first slideable top panel 122 may be partially concealed (e.g., more than 50, 75, or 90 percent) or completely concealed beneath the upper surface 20 or beneath the second slideable top panel 122. The first slideable top panel 122 may slide relative to the engine hood 14 via any suitable mechanism. For example, the first slideable top panel 122 may slide within tracks 130 coupled to the engine hood 14 and disposed longitudinally on opposite lateral sides of the first slideable top panel 122.

Figure 11:
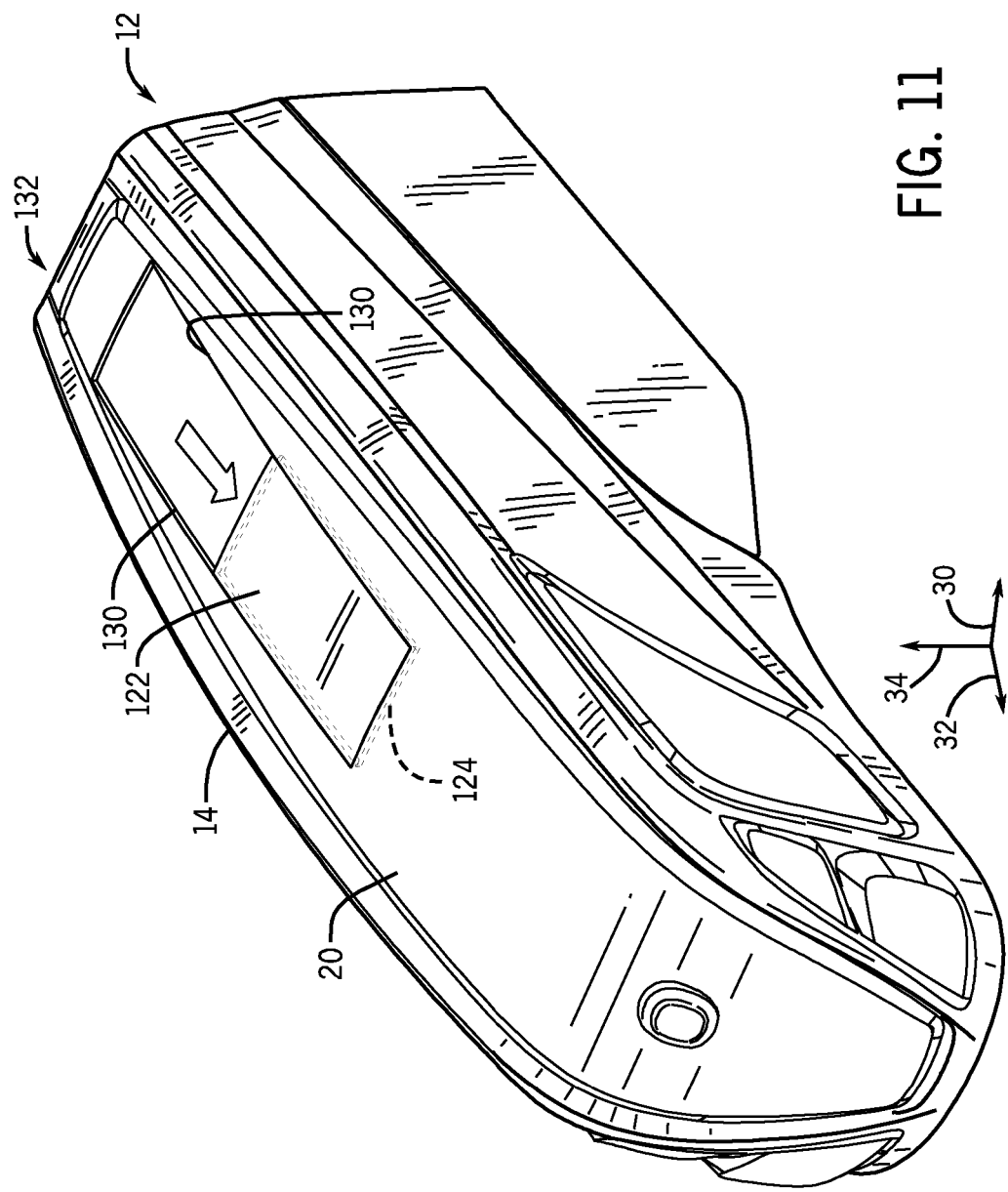
FIG. 11 is a perspective view of an embodiment of the engine hood of FIG. 7 with the slidable top panels in a second open position.

FIG. 11 is a perspective view of an embodiment of the engine hood 14 with the second slidable top panel 124 in an open position 132. In the open position 132, the second slideable top panel 124 may move forward beneath or above the first slideable top panel 122, or the second slideable top panel 124 may move rearward (e.g., rearward and/or vertically) beneath the upper surface 20 of the engine hood 14 to expose (e.g., uncover) at least a portion of the engine compartment. In the open position 132, the second slideable top panel 124 may be partially concealed (e.g., more than 50, 75, or 90 percent) or completely concealed beneath the upper surface 20 or beneath the first slideable top panel 122. The second slideable top panel 124 may slide relative to the engine hood 14 via any suitable mechanism. For example, the second slideable top panel 124 may slide along tracks 130 coupled to the engine hood 14 and disposed on opposite sides of the second slideable top panel 24.

In some embodiments, the first slideable top panel 122 may be in the open position 128 and the second slideable top panel 124 may be in the open position 130, thereby exposing at least a portion of the engine compartment. In some such embodiments, the first slideable top panel 122 may move forward under the upper surface 20 and the second slideable top panel 124 may move rearward under the upper surface 20. However, in some such embodiments, the first slideable top panel 122 and the second slideable top panel 124 may move in the same direction to expose the engine compartment (e.g., both slideable top panels 122, 124 may move forward under the upper surface 20 or rearward under the upper surface 20 of the engine hood 14). Although two slideable top panels 122, 124 are shown, any suitable number (e.g., 1, 3, 4, or more) slideable top panels may be provided to facilitate air flow through the engine compartment. For example, a single slideable top panel positioned adjacent to the upper surface 20 of the engine hood 14 may be configured to move forward and/or rearward between a closed position and an open position to expose (e.g., uncover) at least a portion of the engine compartment, thereby cooling the engine.

Figure 12:
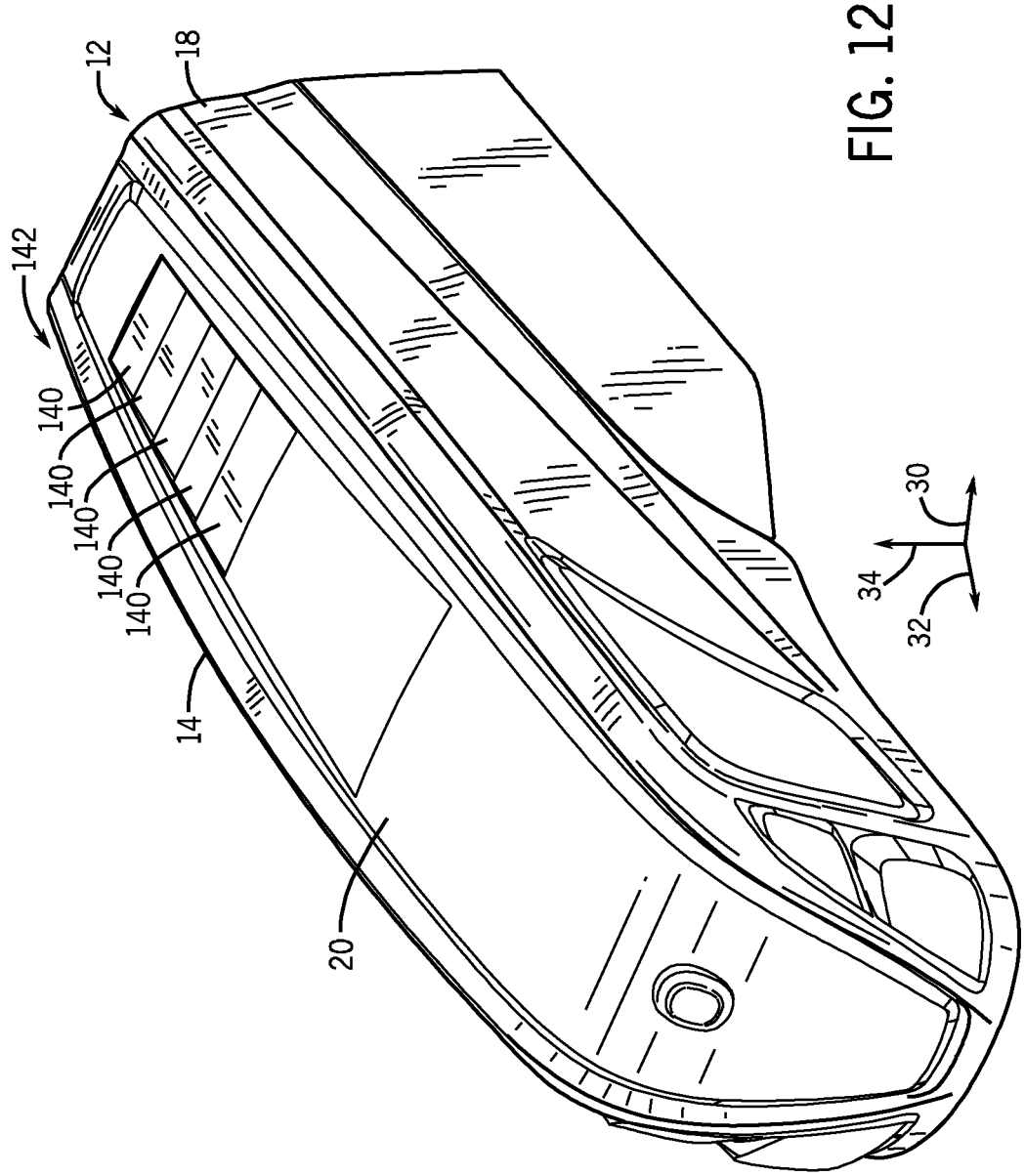
FIG. 12 is a perspective view of an embodiment of an engine hood with hinged panels that may be used with the off-road vehicle of FIG. 1.

FIG. 12 is a perspective view of hinged panels 140 positioned adjacent to the upper surface 20 of the engine hood 14. In the illustrated embodiment, the hinged panels 140 are in a closed position 142. In the closed position 142, the hinged panels 140 are configured to cover the engine, thereby protecting the engine from freezing ambient air, debris, or the like. The hinged panels 140 are configured to move relative to the engine hood 14. The hinged panels 140 may be adjusted in a similar manner as the movable side panels 16 discussed above with respect to FIGS. 1-9. For example, the controller 102 may be configured to control one or more actuators coupled to the hinged panels 140 to rotate the hinged panels 140 relative to the engine hood 14 based on any of a variety of inputs or factors, including signals indicative of the engine temperature obtained by the engine temperature sensor 104, signals indicative of a position of the movable side panels 16 obtained by the position sensor 105, a temperature of the ambient air an operator input received via the operator input 110, and/or a desired engine temperature range (e.g., a predetermined range).

Figure 13:
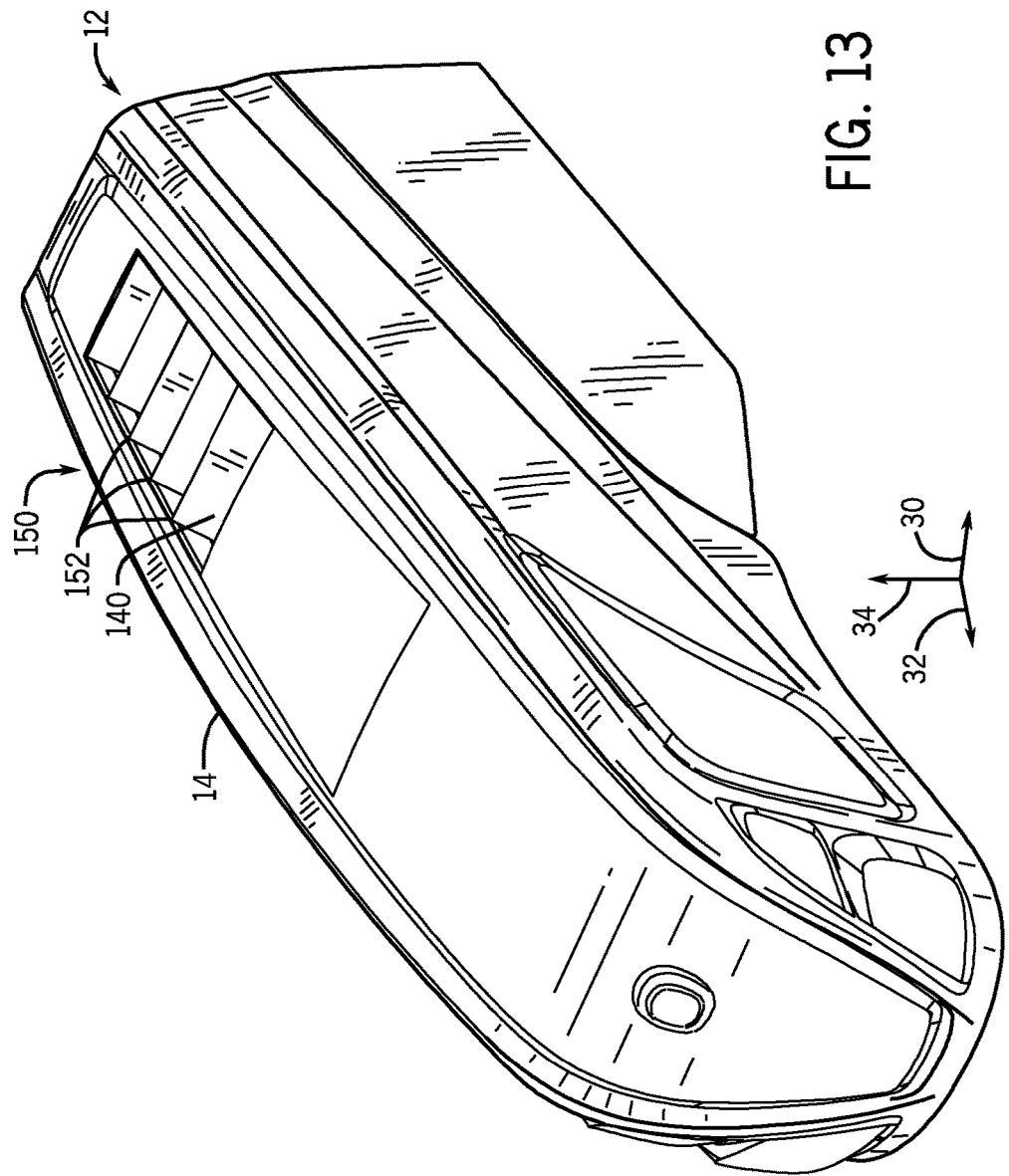
FIG. 13 is a perspective view of an embodiment of the engine hood of FIG. 10 with the hinged panels in an open position.

FIG. 13 is a perspective view of an embodiment of the engine hood having the hinged panels 140 in an open position 150. In the open position 150, each of the hinged panels 140 is rotated about respective pivots 152 relative to the engine hood 14, thereby to exposing (e.g., uncovering) at least a portion of the engine compartment to facilitate engine cooling. Although five hinged panels 140 are shown, any suitable number (e.g., 1, 2, 3, 4, 5, 6, 7, 8, 9, 10, or more) hinged panels 140 may be provided to facilitate air flow through the engine compartment.

Figure 14:
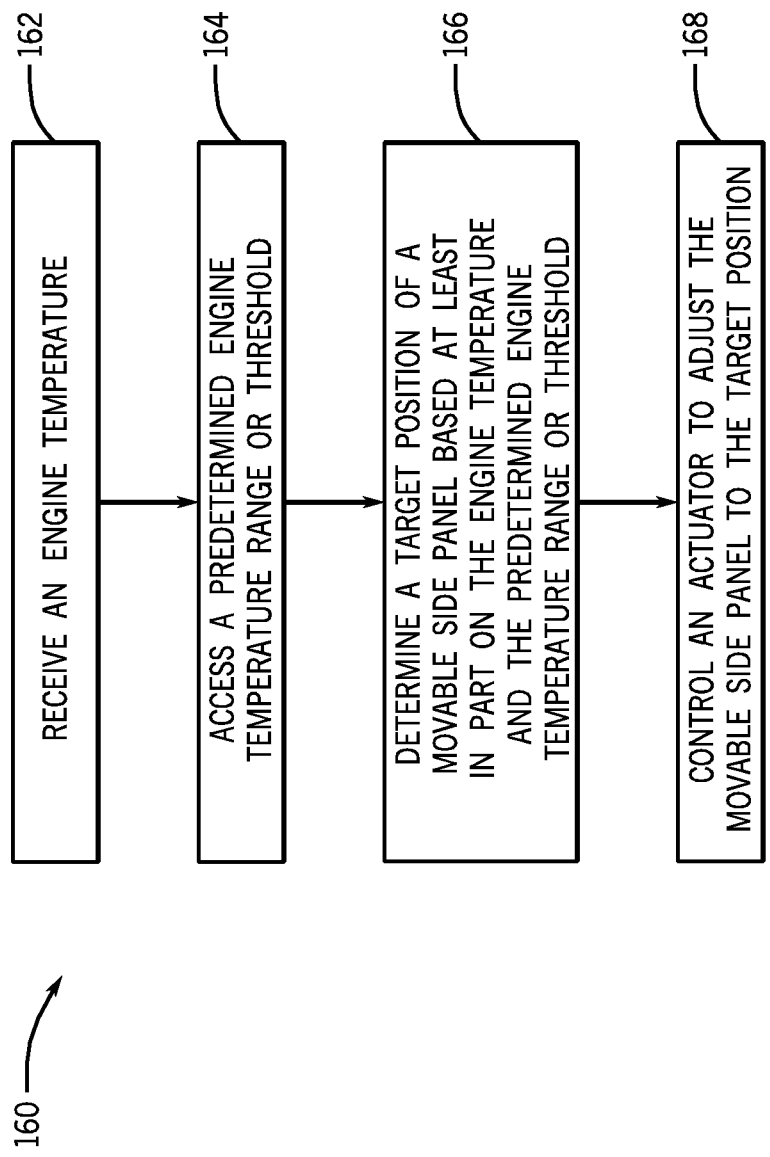
FIG. 14 is a flow diagram of an embodiment of a method for controlling air flow under the engine hood of the off-road vehicle of FIG. 1.

FIG. 14 is a flow diagram of an embodiment of a method 160 for controlling air flow under the engine hood 14 of the off-road vehicle 10. As shown, the method 160 begins with receiving an engine temperature (block 162). As discussed above, the engine temperature may be obtained from one or more engine temperature sensors 104 and signals indicative of the engine air intake flow rate may be provided to the processor 106 of the controller 102. The method 160 also includes receiving the desired engine temperature range or the predetermined engine temperature threshold (block 164). The desired engine temperature range or the predetermined engine temperature threshold may relate to temperatures at which the engine of the off-road vehicle 10 operates efficiently. The desired engine temperature range or the predetermined engine temperature threshold may be stored in and received from the memory device 108 of the controller 102, or from any other suitable source.

The method also includes determining a target position of the movable side panels 16 based at least in part on the engine temperature, the desired engine temperature range and/or the predetermined engine temperature threshold, a current position of the movable side panels 16, and/or an operator input (block 166). The method further includes controlling the one or more actuators 100 to adjust a position of the movable side panels 16 (block 168). In some embodiments, the controller 102 may be configured to provide an indication (e.g., via the display 112) of the engine temperature, the desired engine temperature range or threshold, the current position of the movable side panels 16, and/or the current movement or motion of the movable side panels 16. The movable side panels 16 may be adjusted between the closed position 31, the open position 40, the rear-facing open position 60, and/or the forward-facing open position 70. As discussed above, the disclosed air flow system 12 and methods for adjusting various components of the air flow system 12 enable the air flow through the engine compartment to be controlled to approximately maintain the engine within the desired engine temperature range and also enables protecting the engine in certain conditions. The disclosed embodiments provide effective engine cooling, thereby improving engine operation and efficiency, and also protect the engine from debris, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An air flow control system for an off-road vehicle, comprising:
   a first movable side panel configured to be positioned proximate to a first lateral side surface of a body of an engine hood of the off-road vehicle; and
   a controller configured to:
      receive a signal indicative of a temperature of an engine of the off-road vehicle;
      access a desired engine temperature range from a storage device;
      output a first control signal to instruct one or more actuators to move the first movable side panel laterally outward relative to the first lateral side surface of the body of the engine hood to enable a flow of air through a gap between the first movable side panel and the body of the engine hood when the first signal indicates that the temperature of the engine of the off-road vehicle is greater than the desired engine temperature range during operation of the engine;
      output a second control signal to instruct the one or more actuators to move the first movable side panel to a closed position in response to shut-down of the engine of the off-road vehicle;
      receive an operator input to close the first movable side panel via an input device; and
      output a third control signal to instruct the one or more actuators to move the first movable side panel to a rear-facing open position in response to receipt of the operator input to close the first movable side panel while the signal indicates that the temperature of the engine of the off-road vehicle is greater than the desired engine temperature range during operation of the engine, thereby blocking debris and facilitating air flow under the engine hood, and wherein a rearward portion of the first movable side panel is positioned a first distance laterally outward from the first lateral side surface of the body of the engine hood and a forward portion of the first movable side panel is positioned a second distance, less than the first distance, laterally outward from the first lateral side surface of the body of the engine hood when the first movable side panel is in the rear-facing open position.

2. The air flow control system of claim 1, wherein the one or more actuators comprises one or more of a hydraulic cylinder, a pneumatic cylinder, or an electric motor.

3. The air flow control system of claim 1, comprising one or more bars coupled to and extending laterally inward from the first movable side panel, wherein the one or more bars include an adjustable portion configured to move relative to the body of the engine hood, and a stationary portion fixedly coupled to the body of the engine hood.

4. The air flow control system of claim 1, wherein the first movable side panel is configured to move to an angled open position in which at least a portion of the first movable side panel is positioned laterally outward from the first lateral side surface of the body of the engine hood and in which the first movable side panel is oriented at an angle relative to the first lateral side surface of the body of the engine hood, wherein the angled open position is a rear-facing open position in which at least a rear portion of the first movable side panel is positioned laterally outward from the first lateral side surface of the body of the engine hood.

5. The air flow control system of claim 1, comprising a second movable side panel configured to be coupled to a second lateral side surface, opposite the first lateral side surface, of the body of the engine hood of the off-road vehicle.

6. The air flow control system of claim 1, wherein the controller is configured to instruct a display to provide a visual indication of at least one of a current position of the first movable side panel or a current movement of the first movable side panel.

7. The air flow control system of claim 6, wherein the display is positioned within a cab of the off-road vehicle.

8. An air flow control system for an off-road vehicle, comprising:
   a first movable side panel configured to be positioned on a first lateral side of a body of an engine hood of the off-road vehicle;
   one or more bars extending laterally inward from the first movable side panel, wherein the one or more bars are configured to couple the first movable side panel to the body of the engine hood, and the one or more bars are telescoping bars comprising a stationary portion fixedly coupled to the body of the engine hood and an adjustable portion configured to slide relative to the stationary portion, wherein the one or more bars comprise at least one forward bar positioned proximate to a forward edge of the first movable side panel and at least one rearward bar positioned proximate to a rearward edge of the first movable side panel; and
   one or more actuators coupled to the one or more bars and configured to move the adjustable portion of the one or more bars and the first movable side panel laterally outward relative to the first lateral side of the body of the engine hood in response to one or more signals from a controller of the air flow control system, wherein the at least one forward bar is coupled to a first actuator of the one or more actuators and the at least one rearward bar is coupled to a second actuator of the one or more actuators.

9. The air flow control system of claim 8, wherein the first actuator is configured to adjust the forward bar to extend the forward edge of the first movable side panel a first distance laterally outward from the first lateral side of the body of the engine hood, and the second actuator is configured to adjust the rearward bar to extend the rearward edge of the first movable side panel a second distance, different from the first distance, laterally outward from the first lateral side of the body of the engine hood.

10. The air flow control system of claim 8, comprising one or more slideable top panels configured to be positioned on a top surface of the body of the engine hood and to slide relative to the body of the engine hood between an open position in which at least a portion of an engine of the off-road vehicle is exposed and a closed position in which the portion of the engine is covered.

11. The air flow control system of claim 8, comprising one or more hinged panels configured to be positioned proximate to a top surface of the body of the engine hood and to rotate relative to the body of the engine hood between an open position in which at least a portion of an engine of the off-road vehicle is exposed and a closed position in which the portion of the engine is covered.

12. The air flow control system of claim 8, comprising a second movable side panel configured to be positioned on a second lateral side of the body of the engine hood, wherein the one or more actuators are configured to move the second movable side panel laterally outward relative to the second lateral side body of the engine hood in response to one or more signals from the controller of the air flow control system.

\* \* \* \* \*